United States Patent [19]

Golonka, Sr. et al.

[11] 4,241,285
[45] Dec. 23, 1980

[54] POWER SUPPLY FOR SMAW WELDING AND STUD WELDING

[75] Inventors: Kenneth A. Golonka, Sr., Richmond Heights; Gary Spiegelberg, Lagrange, both of Ohio

[73] Assignee: Erico Products, Inc., Cleveland, Ohio

[21] Appl. No.: 920,397

[22] Filed: Jun. 29, 1978

[51] Int. Cl.³ .............................................. B23K 9/09
[52] U.S. Cl. ................................. 219/130.32; 210/98
[58] Field of Search ...................... 219/98, 99, 130.31, 219/130.32, 130.33

[56] References Cited

U.S. PATENT DOCUMENTS

| | | | |
|---|---|---|---|
| 3,162,747 | 12/1964 | Netzsch | 219/98 |
| 3,355,570 | 11/1967 | Glorioso | 219/98 |
| 3,526,742 | 9/1970 | Hill | 219/98 |
| 3,896,287 | 7/1975 | Cook | 219/130.33 |
| 4,031,349 | 6/1977 | Glorioso | 219/98 |
| 4,048,467 | 9/1977 | Wertli et al. | 219/130.31 |
| 4,071,885 | 1/1978 | Bilczo et al. | 219/130.33 |
| 4,117,298 | 9/1978 | Raycher | 219/98 |

Primary Examiner—B. A. Reynolds
Assistant Examiner—Clifford C. Shaw
Attorney, Agent, or Firm—Maky, Renner, Otto & Boisselle

[57] ABSTRACT

An electronically controlled power supply is adaptable upon throwing a single mode changing switch for shielded metal arc welding (SMAW) and stud welding. The power transformer and control circuitry of a stick welding power supply are, according to the invention, adapted with facility for higher power output, relative to that required for stick welding, for a relatively short timed duration suitable for stud welding. Safety shut down features improve safe use of the power supply, particularly during stud welding, and protect against transformer overload.

39 Claims, 6 Drawing Figures

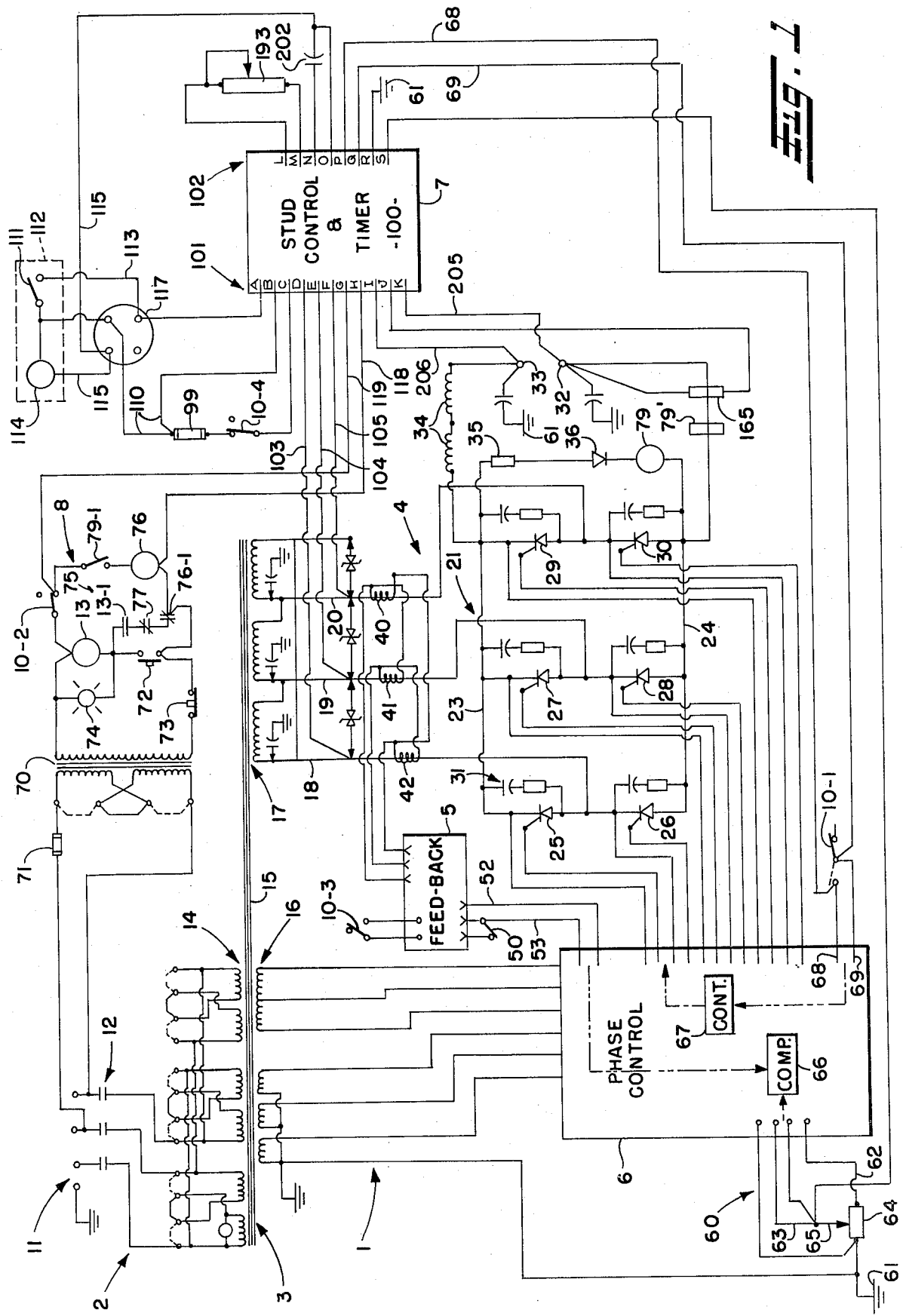

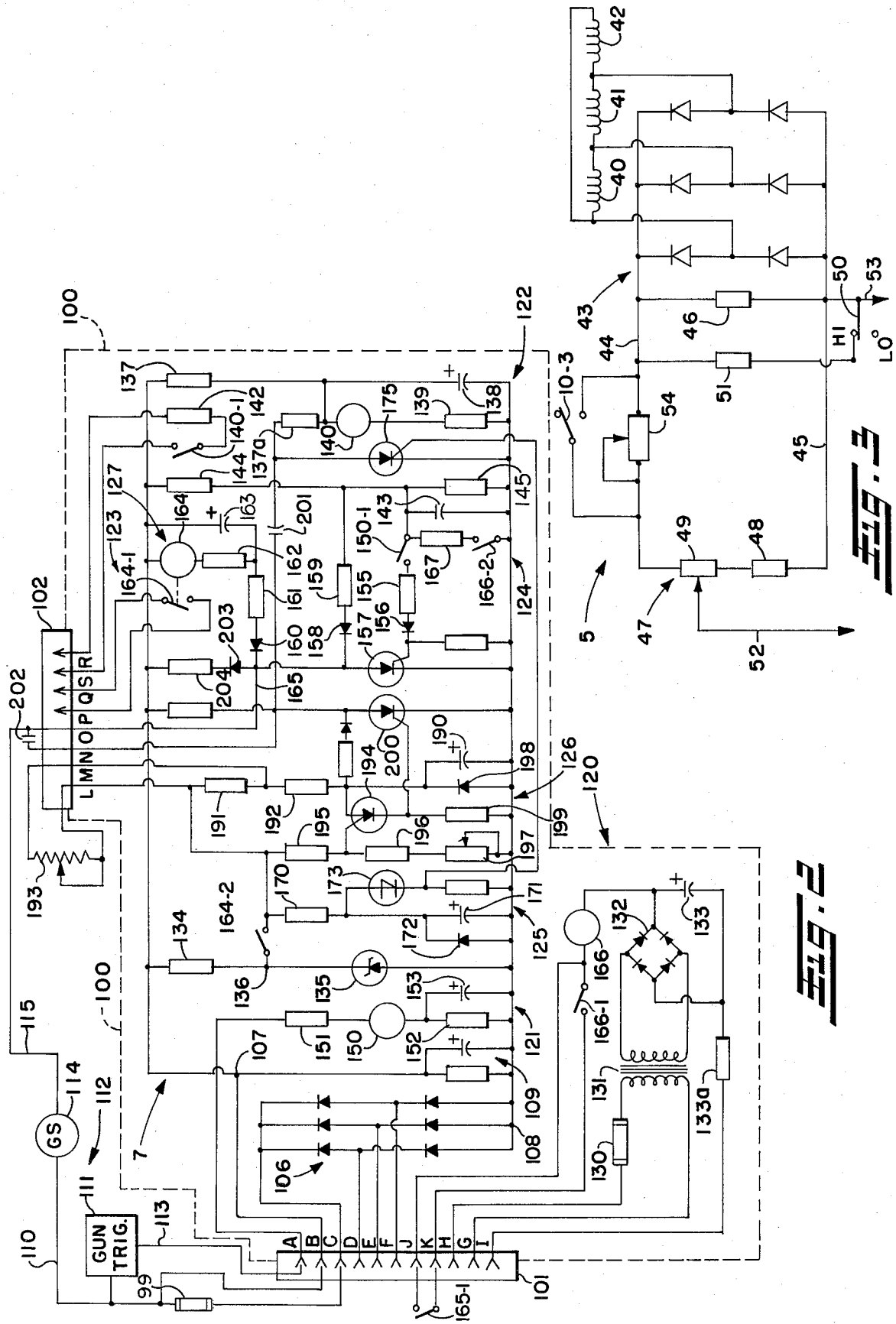

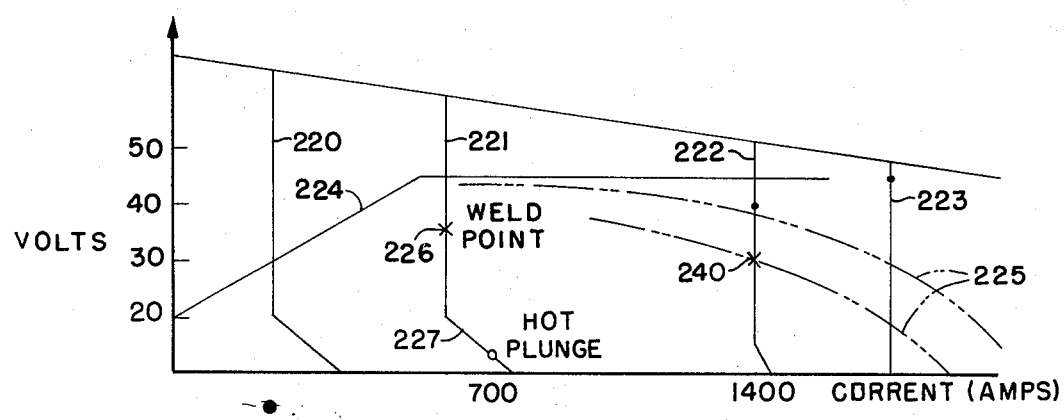
_Fig. 4_
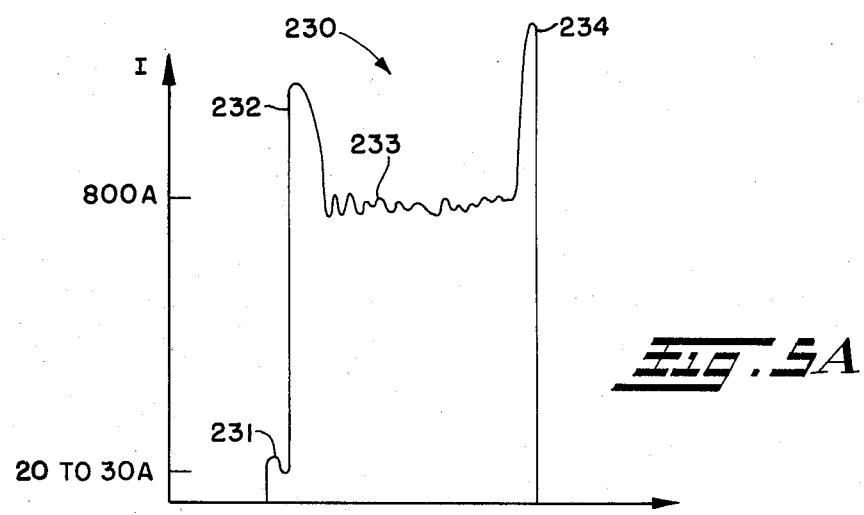
_Fig. 5A_
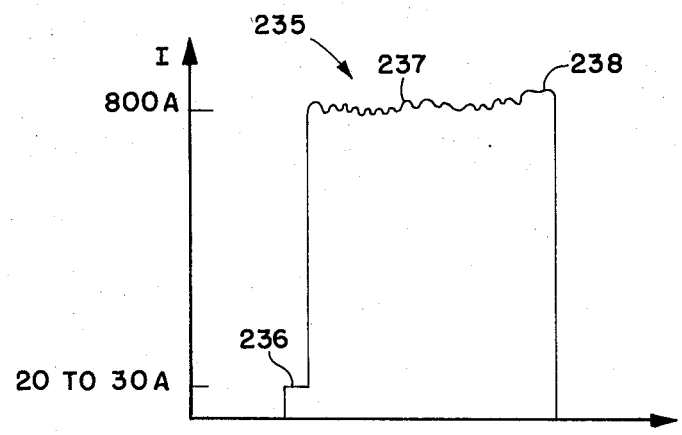
_Fig. 5B_

POWER SUPPLY FOR SMAW WELDING AND STUD WELDING

TECHNICAL FIELD

The present invention relates to electrical power supplies and, more particularly, to an electrical power supply that is useful for both stick welding or other generally continuous welding type process and for stud welding or other timed interval type welding.

BACKGROUND OF PRIOR ART

In traditional electrical welding processes an electric arc produced substantially continuously for a relatively long period of time generates heat adequate to accomplish the welding function. The substantially continuous long duration arc requires an electrical power supply capable of producing on a substantially continuous basis output power at an adequate voltage and current level. Such power supplies usually include a main power transformer the size and temperature capacity of which are principal factors limiting the magnitude of the output or welding signal produced thereby.

One power supply presently used for shielded metal arc welding (SMAW), a term that will be used herein equivalently with continuous welding to indicate all continuous type welding processes including, for example, arc-air gouging, is manufactured and sold by Miller Electric Company under the designation Gold Star 600SS. That power supply includes a three phase low reactance or constant potential transformer with electronic control circuitry capable of providing a controlled continuous constant current DC output welding current. The transformer has three primaries receiving three phase input power and three secondaries, which are coupled to a full converter thyristor bridge circuit to produce the output welding signal. The bridge circuit is phase controlled in response to a feed-back signal providing information of the secondary current and a reference signal that is selectively adjustable by the user according to the desired power level of the welding signal.

In the Miller power supply closed loop feed-back is employed for the phase modulation as a function of the feed-back information. Such closed loop feed-back provides a number of advantages including, for example, constant current output, immunity to fluctuations in line voltage or line voltage compensation, and the ability to dial a desired current output. Moreover, the controlled bridge is preferably a full converter thristor bridge that assures turn-off of the thyristors, regardless of the impedance at the output terminals. In this manner, the full converter bridge may act as an output contactor.

In the art of stud welding the magnitude of the welding current, i.e. the output power, of the power supply usually must be larger, often by a factor of two or more, than the maximum power capability of many conventional stick welding power supplies. However, stud welding is a relatively short duration process in which the power supply usually is producing a welding signal only a fraction of a second.

One prior technique used to produce adequate welding current and welding voltage for stud welding was a brute force method with very large transformers and dropping resistors employed to obtain correct welding current, but this technique uses energy inefficiently. A second approach has been to use a magnetic amplifier or combination magnetic amplifier and saturable reactor to control the current of the weld. Although this method more efficiently utilizes the electromagnetic energy to obtain current levels for stud welding, in most cases those current levels are too high for stick welding and the magnetic amplifier or saturable reactor would not provide adequate range control. Therefore, in the past it was impractical to provide a dual function welding power supply for both stick welding and stud welding.

In past stud welding power supplies very high current capacities were necessary to provide hot plunge capability, i.e. to plunge the stud to engage the base metal while continuing nearly short circuit current flow. It would be desirable to limit such short circuit current while maintaining hot plunge ability. k There is incompatibility between stick welding and stud welding power supplies; in the former only power is controlled, whereas in the latter power, time, reduced current start and hot plunge functions are desirably controlled and generally a higher power output is necessary. It would be desirable, however, to be able efficiently to combine in a single power supply the capabilities of performing a wide range of both stick welding and stud welding operations.

BRIEF SUMMARY OF INVENTION

According to the present invention an electrical power supply is capable of delivering, on the one hand, continuously a relatively constant regulated output current for use in continuous or SMAW welding type processes and, on the other hand, a relatively higher output current for an accurately controlled short time duration for stud welding processes. When operating for SMAW welding the transformer can produce continuously a maximum of its normal rated power output at a 60% duty cycle, but when operating for short duration stud welding intervals the transformer output power can be significantly increased, say by a factor of two or more, to provide adequate stud welding power without overloading the transformer. The throwing of a single multiple function switch can convert the power supply, including the main transformer thereof as well as at least portions of common control circuitry, from one intended for operation in a continuous welding type mode to one ready for operation in a timed interval mode for stud welding. The present invention, then, overcomes the basic incompatibility between prior SMAW welding power supplies and stud welding power supplies. As a result, the overall manufacturing cost and energy cost efficiencies of welding power supplies are improved.

Briefly, the power supply of the invention is an apparatus for producing output electrical power for substantially continuous type welding and for stud welding with a mode changing device for changing the mode of operation of the power supply from substantially continuous type operation to timed operation for stud welding. Moreover, the invention provides a facile technique for converting a conventional electronically controlled SMAW welding power supply for use as a stud welding power supply. Such conversion is accomplished by increasing the controlled power output capability of the power transformer and its control circuit, adding a timer sequence circuit for cooperatively controlling a conventional stud welding gun and the power transformer and its control circuitry, and adding safety shut-down circuitry to prevent overloading the power transformer during stud welding.

In the power supply energy conversion apparatus converts input electrical power to regulated output electrical power with selective adjustment of the output power magnitude, feed-back circuitry monitors the magnitude of the output power, and power control circuitry controls the magnitude of the output power. When operational in a continuous mode, the magnitude of the output power signal will be limited according to the operational parameters of the energy conversion equipment. When operated in the timed interval mode, the output power capability of the energy conversion and control circuitry is increased to produce a larger magnitude output signal but only for an adjustable relatively short time interval. That time interval is satisfactorily long to accomplish the stud welding task but is suitably short relative to continuous SMAW welding time to avoid overloading of the energy conversion and control circuitry. Thus, a power supply ordinarily intended for continuous duty operation for SMAW welding may be used at appreciably higher power levels over the relatively short duty cycles for stud welding.

To improve the safe operation of the power supply and to avoid transformer overload when operted in timed interval mode, an automatic shut-down circuit terminates the output signal a predetermined time period after commencement thereof even though no welding has occurred during that period. Moreover, the longevity of the stud welding equipment, and particularly the stud welding gun, is increased by a deactivating or latching circuit that is operative after a stud welding cycle to prevent further such cycles until the gun is re-set.

By utilizing closed loop feed-back, the power supply of the invention has a constant current output, line voltage immunity or line voltage compensation, and the ability to employ a pre-set current dial capability. Moreover, in accordance with utilization of the power supply for stud welding, the closed loop feed-back system enables a reduced current start, a desirable characteristic in stud welding prior to lifting the stud from the workpiece, utilizing the electronic response and normal welding choke of the power supply. Also, the accurate power control minimizes overshoot when maximum current flow commences after the reduced current start, thereby further avoiding stickers, improving the weld, improving energy efficiency and minimizing utility company power charges when peak demand meters are used. Additionally, such closed loop feed-back system assures a controlled short circuit current when the stud is plunged back to the workpiece thereby minimizing spatter upon plunging, assuring good, consistent stud welding operation, and minimizing power spikes. In addition, the constant current output current provides added flexibility enabling convenient changes in welding cable length without affecting the actual weld parameters, namely the current magnitude.

With the foregoing in mind it is a principal object of the invention to provide a dual function electrical power supply for welding and, more particularly, to provide such a power supply that is convertible in a facile manner from one operable in a continuous welding type mode to one operable in a timed interval mode for stud welding.

Another object is to convert a SMAW welding power supply for use in stud welding.

An additional object is to improve the safety, reliability and controllability of a stud welding power supply and to avoid transformer overload.

A further object is to provide line immunity, controlled reduced current start, constant current output and controlled short circuit current, for example, during plunge, in a stud welding power supply.

Still another object is to facilitate power calibration and control for a stud welding power supply.

Still an additional object is to increase the power output from a SMAW welding power supply to enable its use as a stud welding power supply.

Still a further object is to facilitate operative conversion of a SMAW welding power supply, especially a readily commercially available one, for use in stud welding. This object achieves the important advantages of inventory reduction, minimum cost, and convenient available source or supply of equipment.

Even another object is to improve the safe usage of a stud welding power supply.

Even an additional object is to incorporate stud welding gun chuck saver function in a convertible SMAW welding and stud welding power supply.

These and other objects and advantages of the present invention will become more apparent as the following description proceeds.

To the accomplishment of the foregoing and related ends, the invention, then, comprises the features hereinafter described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a schematic electric circuit diagram, partly in block form, of a power supply in accordance with the present invention;

FIG. 2 is a schematic circuit diagram of the stud control and timer circuitry for the circuit of FIG. 1;

FIG. 3 is a schematic circuit diagram of the feed-back circuitry for the power supply of FIG. 1;

FIG. 4 is a graphical representation of the voltage and current capability of the power supply in accordance with the invention;

FIG. 5A is a graphical representation of the current magnitude of the output signal of a conventional stud welding power supply; and FIG. 5B is a graphical representation of the current magnitude of the output signal produced by the power supply in accordance with the present invention when operated in a timed interval mode for stud welding.

DETAILED DESCRIPTION OF INVENTION

Referring now in detail to the drawings, a power supply in accordance with the present invention is generally indicated at 1 in FIG. 1. The power supply 1 includes an input circuit 2, a power transformer 3, an output circuit 4, a feed-back circuit 5, an adjustable phase control circuit 6, a stud control and timer circuit 7, and a start-stop circuit 8. The transformer 3 and output circuit 4 are an energy conversion apparatus converting input AC power to a DC welding signal. A single mode selecting switch with multiple pole multiple throw switch portions 10-1 through 10-4, illustrated in respective operative connections for stud welding, may be selectively thrown to the illustrated or alternate connections for enabling the power supply 1 alternatively to operate in the stick welding mode.

The input circuit 2 is connected at terminals 11 to receive a supply of three phase electrical power of, for example, 230 volts, 460 volts, etc., depending on the power availability from the utility company. Normally open input contactors 12 may be closed under control of an input contactor solenoid 13 to supply the input power to the plural primaries 14 of the power transformer 3. The power transformer 3 has a core 15, control secondaries 16, which provide power to the phase control circuit 6, and power secondaries 17.

In the output circuit 4 three phase electrical power provided by the power secondaries 17 on lines 18, 19 and 20 is full wave rectified by a full converter bridge circuit 21 under control of the phase control circuit 6 to provide on lines 23, 24 a relatively accurately regulated signal. The rectifier circuit 21 includes controlled rectifiers, such as SCR's 25-30, each of which has its gate coupled to the phase control of circuit 6 for selective gating to conduction. A conventional resistor and capacitor snubber circuit, such as the circuit 31, is connected across each SCR to avoid improper turn-on thereof. Depending on the phase control firing of the SCR's 25-30, an output welding current of controlled power is provided via the output terminals 32, 33 via welding choke 34 for connection by a cable to deliver the welding output for generating an electric arc from the electrode to a base metal workpiece for welding threat. A resistor 35 and diode 36 load the bridge rectifier 21 to facilitate pulse firing of the SCR's by the phase control circuit 6.

The feed-back circuit 5 produces a feed-back voltage proportionally representative of the welding signal power. It includes three current transformers 40, 41, 42 connected to a full wave bridge rectifier 43, as is illustrated in FIG. 3, to produce across the lines 44, 45 a signal representative of the average current flowing through the lines 18, 19, 20 in the output circuit 4. A resistor 46 loads the bridge rectifier 43. An adjustable calibration circuit 47 in parallel with the resistor 46 includes a fixed resistor 48; an adjustable potentiometer 49, which provides a calibrating function; and a range adjusting switch 50, which, as shown, is in the high range position to connect the fixed resistor 51 effectively to reduce the magnitude of the feed-back voltage on feed-back lines 52, 53. The phase control circuit 6 in conventional manner in response to the feed-back voltage and a selectable reference voltage signal advances or retards the gating of the SCR's in the bridge rectifier 21 to control the magnitude, particularly current, of the welding signal. k Moreover, a further adjustable potentiometer 54 selectively connected in the adjustable calibration circuit 47 can reduce the feed-back voltage during stud welding to advance the SCR gating in the bridge rectifier 21 to increase the welding signal above stick welding power. During stick welding operation the mode switch 10-3 is closed to short across the potentiometer 54 removing it from the adjustable calibration circuit 47.

Turning back to FIG. 1 reference voltage generator 60 coupled between a ground connection 61 and an accurately regulated voltage potential provided on line 62 by a conventional voltage regulator circuit, such as a zener diode circuit in the phase control circuit 6, produces on reference line 63 a reference signal voltage indicative of the desired power level of the welding signal. The reference voltage generator includes a conventional rheostat 64 with a movable wiper arm 65 that can be adjusted between a minimum low voltage potential and a maximum high voltage potential representative, respectively, of minimum and maximum amplitude welding signals. The reference voltage is delivered to the phase control circuit 6, which may be a conventional phase control circuit with a comparator 66 that compares the reference voltage with the feed-back voltage from the feed-back lines 52, 53. In response to that comparison, the phase control circuit 6 advances or retards the respective gating signals delivered to the repective SCR's 25-30 in the bridge rectifier 21. As the reference voltage on line 63 is increased, the gating signals will be advanced and vice versa.

The phase control circuit 6 also includes respective solid state contactors 67 that may be closed to permit delivery of gating signals to the bridge rectifier 21 or opened to block such delivery. When the mode switch 10-1 is in the stick welding connection, as shown by dotted line in FIG. 1, a connection is provided via the lines 68, 69 to energize the electronic gate supply and, thus, close such output contactors 67 when power is delivered via the control secondaries 16 to the phase control circuit 6. On the other hand, when the mode switch 10-1 is in the stud welding position, as shown in solid line, the connection for lines 68, 69 and, thus, delivery of gating signals and production of a welding signal will be controlled by the stud control and timer circuit 7, as will be described further below.

The start circuit 8 has a start transformer 70 connected via an overload protection fuse 71 for continuous energization whenever input power is supplied to the terminals 11, regardless of whether or not the input contactors 12 are closed. On the secondary side of the start transformer 70 the input contactor solenoid 13 is connected by a normally open start switch 72 and a normally closed stop switch 73 across the transformer secondary, and a pilot indicator lamp 74 indicates the state of energization of the input contactor 13. A holding/disabling circuit 75 connected across the start switch 72 includes a pair of normally closed time delay relay contacts 76-1, normally closed thermal overload contacts 77, and normally open holding contacts 13-1. When the start switch 72 is briefly closed, the input contactor solenoid 13 is energized to close the input contactors 12 and the normally open holding contacts 13-1, whereby the latter maintain the input contactor solenoid 13 energized. A brief opening of the stop switch 73 will deenergize the input contactor solenoid 13 to open the input contactors 12 deenergizing the power supply 1. The thermal overload contacts 77 form part of a thermostat, not otherwise shown, which is preferably mounted on the power transformer 3 to monitor the temperature thereof. If the power transformer temperature exceeds a predetermined one, e.g. due to overload tendency, the thermal overload contacts 77 open to deenergize the input contactor solenoid 13 and the power supply 1, thus avoiding transformer overload. The start circuit 8 also includes the mode switch 10-2, a normally open reed switch 79-1, which is closed upon current flowing past either of two coils 79, 79' of a common reed relay, and a time delay relay coil 76, which operates the time delay relay contacts 76-1.

SMAW WELDING OPERATION

For SWAM or stick welding operation the mode selecting switches 10-1 through 10-4 are placed in the stick welding connection mode, i.e. opposite to that illustrated. The range selecting switch 50 is adjusted to a low or high range connection, depending on the desired magnitude of the welding signal current, i.e. below 400 amps or from about 50 to 750 amps, respectively. Moreover, the wiper arm 65 of the rheostat 64 in the reference voltage generator 60 is adjusted to produce a selected reference voltage representative of the desired magnitude of welding signal current.

Upon closure of the start switch 72, the input contactor solenoid 13 is energized to close the holding contacts 13-1, thus holding the same energized, and to close the input contactors 12, thus delivering power to the power transformer 3. The artificial load circuit including resistor 35 causes a voltage drop between the lines 23, 24 of the bridge rectifier 21 in the output circuit 4, and the phase control circuit 6, with its solid state output contactors closed, yielding open circuit voltage from the power source by applying appropriately timed gating signals for the SCR's 25-30. The welding signal, then, is produced across the bridge rectifier 21 and is delivered via the welding choke 34 to the output terminals 32, 33 to effect stick welding. Adjustment of the internal potentiometer 49 in the feed-back circuit 5, provides for calibration of the actual output power to correspond with that dialed on the rheostat 64. The power transformer 3, output circuit 4, feed-back circuit 5 and phase control circuit 6, then, cooperate to maintain an accurately regulated current with adequate voltage at the output terminals 32, 33, as is conventionally achieved in the above-mentioned Miller power supply. To stop the power supply 1, the stop switch 73 may be pressed to deenergize the input contactor solenoid 13 and input contactors 12. Similarly, upon sensing an excessive temperature of the power transformer 3, the thermal overload contacts 77 may open to deenergize the input contactor solenoid and input contactors 12 thus disabling the power supply 1 until the temperature drops and the start switch is pressed again.

STUD WELDING SET UP

For stud welding mode, the mode selecting switch is adjusted to throw the portions 10-1 through 10-4 thereof into the stud welding connection as illustrated. The switch portion 10-2 places the reed switch 79-1 and time delay relay 76 into operative connection in the start circuit 8, and the switch portion 10-3 places the current adjusting potentiometer 54 into functional operation in the feed-back circuit 5 to reduce or alter the feed-back voltage and to provide additional calibration analogous to that provided by the potentiometer 49. Preferably the range switch 50 is separately thrown to the high range connection to effect reduction or attenuation of the feed-back voltage further increasing the possible magnitude of output welding signal. The switch 10-4 permits energization of the stud control and timer circuit 7 via a fuse 99. Switch portion 10-4 allows the output bridge 21 to act as an output contactor under control of the stud control and timer circuit 7.

The stud control and timer circuit 7 may comprise a single printed circuit board 100 having connection terminal plugs 101 and 102 for electrical coupling with respective circuits external thereof. The plug terminals are labeled A through S. Electrical power is supplied the circuit 7 at terminals D, E, F by leads 103, 104, 105, respectively, from the power transformer secondaries 17 (FIG. 1). A bridge rectifier 106 converts the input power to a DC voltage which is protected by fuse 99 and is provided to power line 107 relative to a ground line 108. A resistor and capacitor combination 109 filters the signal provided on the power line. The power line is connected by lead 110 to the trigger 111 of the conventional stud welding gun 112, which is also connected by a lead 113 to the terminal A. The lifting solenoid 114 of the stud welding gun is also connected to the lead 110 and by a lead 115 to the terminal O. Therefore, whenever there is a relative ground potential provided to the terminal O, the gun solenoid 114 will be energized and after its usual delay period will effect lifting of the stud to draw the main welding arc in stud welding operation. The leads 110, 113, 115 may be a control cable connected to a conventional control cable receptacle 117. Although the power coming to terminals D, E, F arrives only when the input contactors 12 are closed, continuous power is provided the terminals H, G by leads 118, 119 from the start circuit 8 whenever the mode switch 10-2 is in the stud welding connection and the stop switch 73 is closed. Such continuous power is delivered to a chuck saver circuit, latch or lock out circuit 120 to enable the same.

The circuit 7 controls timed sequential operation of the power supply 1 when operative in timed operation stud welding mode. It includes a time sequence starting circuit 121, a reduced current start circuit 122, an output contactor control circuit 123, a gun solenoid control circuit 124, a reduced current time-out circuit 125, and a main welding timer circuit 126. The time sequence starting circuit 121 starts operation of the circuit 7 in response to closure of the gun trigger 111. The reduced current start circuit 122 assures that upon commencing stud welding operation, there is a reduced current state, i.e. the current initially delivered to the stud, e.g. along a path from output terminal 33 via a power cable and the gun chuck and via the power cable and base metal workpiece to which the stud is to be welded, all not shown but conventional, is smaller than the main welding current. The conduction angles of the main SCR's are reduced to give near minimum output current. The output contactor control circuit 123 controls the connecting of the leads 68, 69 for the phase control circuit 6 to enable the output contactor thereof. The gun solenoid control circuit 124 controls the lifting and plunging operations effected by the gun solenoid 114 and in connection with the chuck saver circuit 120 prevents plural cycles of operation of the circuit 7 unless deliberately reset by removing the gun from the welded stud to avoid damage to the chuck. The reduced current time-out circuit 125 deactivates the reduced current start circuit 122 to apply full welding current, as determined by adjusting the rheostat 64, after the gun solenoid lifts the stud to draw the main arc at full power, and the main welding timer circuit 126 subsequently terminates the gun solenoid energization to cause plunging while a hot plunge timing circuit 127 assures a hot plunge.

When the start switch 72 in FIG. 1 is briefly closed to energize the input contactors 12 and the interlock or holding contact 13-1, the power transformer 3 supplies power to the power secondaries 17. Since there is no connection presently between the leads 68, 69 of the phase control circuit 6 because the switch 10-1 is in stud welding connection, the solid state output contactor 67 thereof is not energized and no gating signals are delivered to the SCR's 25-30. However, via the leads 103-105 and 118, 119 power is supplied the stud control and timer circuit 7. The bridge rectifier 106 and fuse 99 deliver a DC voltage on the power line 107. Moreover, power from the start circuit 8 received via lines 118, 119 is coupled by a fuse 130 and a transformer 131 to a full wave bridge rectifier 132 to charge a capacitor 133 in the chuck save circuit 120 placing that circuit in a ready state. A resistor 133a connects the capacitor 133 and full wave bridge rectifier 132 to the negative output terminal 33.

A ballast resistor 134 and a zener diode 135 produce from the power voltage on line 107 a regulated voltage signal at junction 136 as an input to the timing circuits, namely the reduced current time-out circuit 125 and welding duration circuit 126. Moreover, via the power line 107, resistor 137, capacitor 138, and resistor 139, the reduced current start relay 140 is energized to assure that upon commencement of a stud welding cycle of timed operation there will be a reduced current start. Energization of the relay 140 closes the contact 140-1 to place a reduced current start resistor 142 in parallel connection with the effective portion of the reference rheostat 64 to alter or reduce the reference voltage on the reference line 63 in the reference voltage generator 60, thereby to retard the respective gating signals that will be produced by the phase control circuit 6. It has been found undesirable simply to short circuit the rheostat 64 to obtain the reduced current start for such shorting may reduce the reference voltage to zero and may cause instability or unsatisfactory operation of the phase control circuit 6.

The gun solenoid control circuit 124 is readied by charging of the capacitor 143 via the resistors 144, 145, which may be equal, forming a resistance divider circuit. The power supply 1 including particularly the circuit 7 is now ready for a cycle of operation in the stud welding mode.

STUD WELDING OPERATION

Operation of the stud control and timer circuit 7 in connection with overall operation of the power supply 1 in a stud welding mode together with the detailed description of the components forming the circuits 120–127 and their cooperative interrelationships will be described below with reference to several operational stages. Briefly summarizing stud welding operation, a stud and ferrule are placed in the gun 112 and depressed against the base metal, and the trigger 111 is closed. The time sequence starting circuit 121 commences operation of the circuit 7. The output contactor control circuit enables the phase controlled output circuit 4 to produce a welding signal that has a reduced current value of, say, 20 to 30 amps as determined by the reduced current start circuit 122. The gun lifting solenoid 114 is energized by circuit 124 to lift the stud from the base metal and upon lifting a reduced current or pilot arc is drawn. After lifting the reduced current time-out circuit 125 times out and full welding current is provided to produce the full welding current. When the main welding timer circuit 126 times out the gun solenoid 114 deenergizes and the stud is plunged to the base metal as the welding signal is continued by the hot plunge timing circuit 127. Thereafter the chuck save circuit 120 prevents re-cycling of the power supply 1 until after the gun 112 has been removed from the welded stud.

Closing the gun trigger 111 starts the timing sequence starting circuit 121 to commence the first stage of a stud welding cycle and the following operation occurs substantially simultaneously. The starting relay 150 is momentarily energized via resistors 151, 152 and capacitor 153. The momentary energization of the relay 150 closes the contact 150-1 to discharge the capacitor 143 via a resistor 155 and diode 156 into the gate of an SCR 157 causing the latter to become conductive. The conductive SCR 157 via a diode 158 and resistor 159, preferably smaller than resistor 145, clamps the capacitor 143 to minimum voltage level preventing its re-charging. The conductive SCR 157 operates via a diode 160, resistor 161, 162, and capacitor 163 to energize a relay 164 in the output contactor control circuit 123. The energized relay 164 closes contact 164-1 which completes the circuit between the leads 68, 69 of the phase control circuit 6 energizing the output contactors 67 thereof to permit the delivery of gating signals to the SCR's 25–30 in the output circuit 4. Also, the conductive SCR 157 completes a circuit via line 165, terminal O, and line 115 to energize the gun solenoid 114. Capacitor 202 charges and is readied to turn SCR 157 off after the time sequence.

Energization of the relay 164 also closes the contact 164-2 to deliver the regulated voltage from junction 136 to the reduced current time-out circuit 125 and the welding timer circuit 126. During this time, while the latter circuits are timing the stud welding operation, a welding signal that has a current magnitude reduced from maximum desired for stud welding is delivered to the output terminals 32, 33 by the output circuit 4. Although the gun solenoid 114 has been energized, it has an inherent time delay so that the stud will not lift from the base metal workpiece until a predetermined time period after such energization. However the solenoid 114 ordinarily will lift the stud drawing a pilot arc before the main arc is started.

Simultaneously with the production of a power signal across the lines 23, 24 of the bridge rectifier 21 and/or a current flow to the output terminal 32 a coil 79 or 79' of the common reed relay switch senses the same to close the contact 79-1 energizing the time delay relay 76. If the welding operation should continue for a period exceeding that at which the time delay relay is set, for example on the order of about two seconds, the latter will sense the same and open its contact 76-1 to disable the start circuit 8 terminating the welding signal. The reed relay including coils 79, 79' and contact 79-1 in cooperation with the time delay relay 76 assures automatic shut down of the power supply 1 at a predetermined duration after production of a signal across the bridge rectifier 21, whether or not welding takes place. This safety feature assures that any welding signal produced at the output terminals 32, 33 when the power supply 1 is in a stud welding mode will be produced only for the short duration permitted by the time delay relay 76 to minimize production of an output signal when stud welding is not taking place thereby improving the safe use of the power supply 1 and avoiding overloading the transformer 3.

Also simultaneously with the delivery of the welding signal to the output terminals 32, 33, a further reed switch 165 (FIG. 1) closes its contact 165-1 (FIG. 2) to energize the chuck save relay 166 in the chuck saver circuit 120. The energized relay 166 closes its holding or interlock contact 166-1 to maintain the chuck saver operative. In addition, the energized relay 166 closes contacts 166-2 in the gun solenoid control circuit 124 placing a further resistor 167 across the capacitor 143 to prevent the latter from charging to a sufficient voltage capable of firing the SCR 157 to conduction. As long as the chuck saver relay 166 is energized, the gun solenoid control circuit 124 will remain effectively disabled from further SCR firings.

The reduced current time-out circuit 125, which includes resistor 170, capacitor 171, diode 172, and silicon unilateral switch 173 will, after the capacitor 171 has charged to a predetermined voltage magnitude, provide via the line 174 a time-out signal for terminating the reduced current start operation, thus starting the main stud welding arc and the second stage of operation. More specifically, the time-out signal on line 74 gates an SCR 175 to conduction, and the latter cuts off energization of the reduced current start relay 140, whereupon the contact 140-1 is opened and the full value reference voltage developed by the rheostat 64 is delivered to the phase control circuit 6 causing the full welding signal current to be delivered at the output terminals 32, 33.

During this second stage the main welding signal and arc are continued until the welding timer circuit 126 times out. Such time out occurs according to the charging of a charging circuit including a capacitor 190 in response to the regulated voltage from junction 136 and the net resistance of resistors 191 and 192 and adjustable rheostat 193, the latter having an externally accesible dial for adjusting the time constant of such charging circuit and thus welding time from fractions of one second to on the order of about two seconds, e.g. depending on stud size, and being connected across terminals L, M. A programmable unijunction transistor (PUT) 194 is connected to the charging circuit including the capacitor 190 and is also connected to a resistance divider including resistors 195, 196 and potentiometer 197, the latter being internally adjustable in the circuit 7 for fine calibration purposes. A diode 198 is coupled in conventional manner across the capacitor 190, and a resistor 199 is connected to the output of the PUT 194.

The third stage of operation of the circuit 7 commences when the capacitor 190 has charged sufficiently, to fire the PUT 194 which delivers a gating signal to an SCR 200. Conduction by the SCR 200 signals the end of the stud welding cycle. The conductive SCR 200 discharges the capacitor 201 to terminate conduction in the SCR 175 and discharges a commutating capacitor 202 coupled across the terminals N, O to terminate conduction in the SCR 157, thus deenergizing the gun solenoid 114 allowing the stud to be plunged back to the base metal. The capacitor 201 then charges through resistors 137 and 137a. A free-wheeling energy dissipation path for the energy remaining in the gun solenoid 114 is provided via a diode 203 and resistor 204. Moreover, the hot plunger timing circuit 127 includes the capacitor 163 that maintains the relay 164 energized for a brief period after the gun solenoid has been deenergized upon firing of the SCR 200 to continue connection of the leads 68, 69 of the phase control circuit 6 to continue the welding signal as the stud is plunged by the gun to the base metal, providing the controlled hot plunge desired. When the capacitor 163 has discharged, the relay 164 will be deenergized to terminate the welding signal and such discharge is coordinated with the expected rate of plunge to open the contact 164-1 when the stud engages the base metal.

At the conclusion of a stud welding cycle the commutating capacitor 202 charges to reset itself through the SCR 200. Power is, accordingly, removed from the circuits 121 through 126. Since the welding signal has terminated, reed switch contact 79-1 opens to reset the safety circuit of the time delay relay 83. However, as long as the stud welding gun is attached to the welded stud, the charged capacitor 133 has a low resistance circuit path provided via the terminals K and I, leads 205, 206, the stud, and the base metal to which it is welded to continue energization of the relay chuck saver relay 166 preventing recharging of the capacitor 143 by a sufficient amount to repeat a stud welding cycle. During this time the diode 36 in the output circuit 4 blocks the flow of the chuck saver relay 166 holding current through the resistor 35 and reed relay coil 79. When the gun is removed from the welded stud, though, the mentioned circuit path is opened, whereupon the relay 166 is deenergized opening the contact 166-2 to allow the capacitor 143 to charge back to a ready state, thus fully completing a stud welding cycle and resetting the stud control and timer circuit 7 for the next stud welding operational cycle.

It will be appreciated that much of the circuitry illustrated in FIG. 1 is that, for example, contained in the Miller stick welding power supply. In accordance with the present invention, by adding the mode switch 10-1 through 10-4 and associated elements directly affected thereby, such as the potentiometer 54, by modifying the start circuit 8 with the safety shut down components, and by adding the stud control and timer circuit 7, with the above described cooperative interrelationships, the stick welding power supply can be conveniently converted to one capable of excellent use for stud welding.

In FIG. 4 is a graphical load diagram representation of the voltage and current characteristics of the welding signal produced by the power supply 1 at output terminals 32, 33. The constant current regulation provided by the power supply 1 is shown, for example, by lines 220–223 with these being representative for both stick welding and stud welding modes of operation. Thus, for stick welding at a current of about 700 amps, the power supply 1 would maintain a relatively constant regulated current welding signal as the voltage varies depending on the arc length, for example. This regulation is achieved by the cooperation of the output circuit 4, feed-back circuits and phase control circuit 6. The line 224 of FIG. 4 is the NEMA load line, which is the maximum voltage for a given current recommended by NEMA for SMAW welding power supplies and, thus, sets the maximum desired output voltage at respective current levels. In past stud welding power supplies there was no substantial current regulation; rather, in those during hot plunge, for example, the current substantially increased on the order of 2000 amps as the arc length shortened, as is represented, for example, by the dashed lines 225, thus wasting power and losing some measure of power control. To the contrary, though, in accordance with the present invention the welding current is maintained constant during the main arc with the voltage being maintained at a given weld point voltage represented at 226 depending on the arc length, stud size, cable length, etc. On hot plunge, moreover, the voltage of welding signal decreases and although the current is slightly increased, as represented by curve portion 227, it is increased intentionally and only enough to afford good SMAW welding, as compared to that obtained in prior stud welding power supplies. By so limiting the hot plunge short circuit welding current there is no damage to the power supply and, in addition, there may be a substantial savings in utility bills where peak demand metering is used.

The welding current regulation obtained by the power supply 1 of the present invention is further manifest in FIGS. 5A and 5B. The curve 230 in FIG. 5A represents the welding current occurring during time (t)

of a stud welding cycle using a prior stud welding power supply. For a period of about 20 to about 35 milliseconds, shown at curve portion 231, there is a reduced current start with the current being limited to about 20 to about 30 amps. The reduced current start, as was mentioned above, improves the overall welding to prevent the occurring of a "sticker", i.e. a partial fusion of a stud to the base metal, while at the same time providing a pilot arc path over which the main welding arc may be established after the stud is lifted. When the prior power supply begins delivering the main welding current there is a substantial overshoot, as represented by curve portion 232, with the current stabilizing at about 800 amps, for example, as represented by curve portion 233. Upon hot plunge, though, the welding current substantially increases, as shown by curve portion 234, until the welding current is terminated. The prior power supplies had to be built to withstand the large short circuit current represented at curve portion 234, which was an unnecessary expense, and a further unnecessary expense caused by the large short circuit current is the unusually high reading produced on the peak demand utility meter.

However, the power supply 1 in accordance with the present invention eliminates the above disadvantages due to the regulated welding current represented by the curve 235 in FIG. 5B. During operation of the power supply 1, as described above, there is a brief reduced current start period of 20 to 35 milliseconds represented by curve portion 236, to obtain the foregoing advantages. It will be seen that regulation is provided during this period relative to the overshoot seen at 231 in FIG. 5B. When the main welding current is applied there also is no substantial overshoot; rather, the main welding current is promptly accurately brought to the desired level of, for example, 800 amps, as represented by curve portion 237. Moreover, as seen at curve portion 238 near the end of the main welding current period during the hot plunge duration the welding current is still maintained relatively constant, thus avoiding the large overshoot occurring in the prior stud welding power supplies during hot plunge.

For stud welding power supplies in the past saturable reactors and magnetic amplifiers were used to limit the high short circuit currents, as illustrated, for example, at curves 225 (FIG. 4) during welding. However, due to the voltage drop occurring when following one of the curves 225 to obtain a particular weld point 240, for example, of a given voltage and current, the open circuit voltage across the power supply output terminals would usually have to be much higher than the voltage at the weld point. Such high open circuit voltages, which are frequently on the order of 80 to 100 volts, cause a substantial waste of energy.

A particular advantage of the present invention is achieved by using even in a stud welding mode a low reactance, constant potential, type power transformer that has a current output level which is electronically controlled. As a result, the open circuit voltage across the supply output terminals 32, 33 may be much less, say on the order of 68–70 volts, than that necessary in the prior stud welding power supplies, while effective current control and adequate voltage are obtained. The lower open circuit voltage, then, avoids energy wastage encountered in the past and, thus, provides a more efficient utilization of energy in the power supply of the present invention.

STATEMENT OF INDUSTRIAL APPLICATION

In view of the foregoing it will be clear that the power supply 1 may be employed, when the mode selecting switches 10-1 through 10-4 are in the SMAW welding condition, as a power supply for SMAW welding, arc-air gouging or other more continuous electric arc welding processes and, when such switches are in the stud welding position, as a power supply for stud welding operations. When operated in the stick welding mode, the range adjusting switch 50 can be set to a high or low welding current range and the rheostat 64 selectively varied to adjust the desired welding current. Moreover, in both modes of operation the thermal overload relay 77 is operative in response to an excessive transformer temperature to shut down the power supply 1. When the power supply 1 is operated in a stud welding mode, with the range selecting switch 50 preferably in the high range position, selective adjustment of the rheostat 64 determines the main welding current after the reduced current start and adjustment of the rheostat 193 determines the time or duration of the stud welding operation.

The embodiments of the invention in which an exclusive property or privilege is claimed are defined as follows:

1. A combination power supply for use in continuous type welding and in stud welding a wide range of stud sizes, comprising means for producing output electrical power for substantially continuous type welding and for stud welding, including phase controlled energy conversion means for converting AC input power to a DC welding signal, said energy conversion means having a normal power output capability rating for such continuous type welding and for stud welding studs of relatively small size, feed-back means for producing a feed-back signal proportionally representative of such welding signal, reference means for producing a reference signal, comparison means for making a comparison of such feedback and reference signals to provide a control for said energy conversion means, selectively operable control means for increasing the power output capability of said energy conversion means beyond such normal rating to one suitable for stud welding studs of a wide range of stud sizes including relatively large size studs ordinarily not able to be stud welded at such normal rating, including selectively operable sequencing means for controlling a timed sequence of operation of said means for producing output electrical power to produce the same at such increased capability for a relatively short term timed duration suitable for stud welding, and selectively operable mode changing means for changing the mode of operation of the power supply from substantially continuous type operation to increase output power capability timed operation with said control means and sequencing means for stud welding, said mode changing means comprising means for altering the comparison ratio of such feed-back signal and such reference signal, to permit increased conduction angles in said energy conversion means beyond those normally employed during such substantially continuous type operation.

2. The supply of claim 1, said energy conversion means comprising a transformer and a controlled rectifier circuit.

3. The supply of claim 2, further comprising control circuit means for gating said controlled rectifier circuit to determine the magnitude of said DC welding signal.

4. The supply of claim 3, said control circuit means including means for responding to said feed-back signal to stabilize said DC welding signal at a substantially controlled current.

5. The supply of claim 3, said controlled rectifier circuit comprising a full wave rectifier circuit, and said control circuit means comprising electronic phase control circuit means for producing gating signals at times determined by the actual and desired DC welding signal.

6. The supply of claim 4, said reference means including means for producing a reference signal indicative of a desired DC welding signal, and said control circuit means including means for controlling said controlled rectifier circuit in response to a comparison of said feed-back and reference signals.

7. The supply of claim 6, wherein said mode changing means includes means for altering the proportional relation of said feed-back and welding signals in dependence on the operative mode of the power supply.

8. The supply of claim 6, further comprising means for altering the magnitude of said reference signal briefly at the beginning of a cycle of timed operation of the power supply to phase control said controlled rectifier circuit to reduce the welding current while such reference signal is so altered.

9. The supply of claim 8, said means for altering comprising impedance means for attenuating said reference signal, switching means for controllably connecting said impedance means with said control circuit means, and timing circuit means for operating said switching means to so connect said impedance means for a predetermined period at the start of a timed operation of said means for producing.

10. The supply of claim 9, said switching means comprising a relay and controlled switch means for controlling energization of said relay, and said timing circuit means comprising a resistor capacitor charging circuit means for charging at a predetermined rate upon starting of said timed operation and voltage responsive switch means responsive to the charge stored in said charging circuit for operating said controlled switch means to control energization of said relay to disconnect said impedance means when a predetermined charge has been achieved.

11. The supply of claim 2, further comprising sensor means for monitoring a parameter of said means for producing and shutting down the latter upon detecting an excessive condition of such parameter.

12. The supply of claim 11, wherein said parameter is temperature of said transformer and said sensor comprises a temperature sensor.

13. The supply of claim 11, wherein said parameter is the operational time of said means for producing and said sensor means comprises timing circuit means for measuring such operational time.

14. The supply of claim 13, said means for producing including output terminal means for delivering a welding signal and a welding choke connected between said controlled rectifier circuit and at least one of said output terminal means, and said controlled rectifier circuit including a load circuit connected across said controlled rectifier circuit prior to said welding choke, and wherein said sensor means comprises means for sensing the occurrence of a signal produced in said load circuit or a welding signal delivered to said output terminal means.

15. The supply of claims 11, 12, 13, or 14, further comprising start-stop circuit means for controlling delivery of input power to said energy conversion means, said sensor means being coupled to said start-stop circuit means for terminating such input power upon detecting such excessive parameter.

16. The supply of claim 1, said sequencing means comprising synchronizing means for synchronizing operation of said means for producing when in timed operation mode with a stud welding gun having a trigger, whereby said output electrical power is a stud welding signal.

17. The supply of claim 16, said synchronizing means comprising start circuit means for starting such timed sequential operation in response to operation of the stud welding gun trigger.

18. The supply of claim 16, further comprising start circuit means for starting timed sequential operation and welding timer means for terminating such timed sequential operation.

19. The supply of claim 18, said welding timer means comprising a resistor capacitor charging circuit, externally adjustable rheostat means for adjusting the time constant for said charging circuit, charging means for delivering an electrical signal to said charging circuit upon starting of such timed sequential operation, and sensing switch means for ending such timed sequential operation when the charge of said charging circuit achieves a predetermined level.

20. The supply of claim 16, said stud welding gun including a lifting solenoid, and said sequencing means including energizing means for directly energizing said lifting solenoid upon commencing such timed sequential operation, and means for continuing production of said welding signal at an electronically controlled current after said lifting solenoid has been deenergized by said energizing means, whereby said welding signal is continued to provide a controlled current hot plunge of the stud at the conclusion of timed operation of said means for producing.

21. The supply of claim 20, said sequencing means comprising means for attenuating said welding signal until the lifting solenoid has been energized sufficiently long to have lifted a stud from a workpiece.

22. The supply of claim 20, further comprising latch circuit means operable upon completion of a timed operation of stud welding for disabling said sequencing means from further operation until the stud welding gun is removed from a welded stud.

23. The supply of claim 16, said energy conversion means comprising a transformer and a controlled rectifier circuit, and the power supply further comprising electronic control means for phase control gating of said controlled rectifier circuit, said mode changing means comprising means for permitting continuous controlled gating of said controlled rectifier circuit when in continuous mode and for permitting such controlled gating for a timed interval controlled by said sequencing means when in timed operation mode.

24. The supply of claims 1, 7 or 23, wherein said mode changing means comprises a multiple pole multiple throw switch.

25. The supply of claim 23, said energy conversion means further comprising a choke.

26. The supply of claim 23, said electronic control circuit comprising contactor means for controlling the passing of gating signals to said controlled rectifier circuit, and said sequencing means including means for enabling and disabling said contactor means.

27. The supply of claim 23, wherein said electronic control means comprises a comparator means for comparing said feed-back and reference signals to advance or retard respective gating signals and thereby accurately regulate said welding signal.

28. The supply of claim 27, said sequencing means comprising means for retarding respective gating signals to attenuate the current of said welding signal until the lifting solenoid has been energized sufficiently long to have lifted a stud from a workpiece.

29. The supply of claim 1, said control means including means for increasing the normal power output capability of said energy conversion means by a factor of at least two.

30. For use in connection with a power supply for normal operation in a continuous welding type mode, including
   phase controlled energy conversion means for converting input electrical power to regulated output electrical power welding signal having an adjustable substantially constant current characteristic, said conversion means having a normal power output capability rating for such continuous type welding and for welding studs of relatively small size and including
   selective adjustment means for setting a desired magnitude of such welding signal,
   feed-back means for monitoring the magnitude of such welding signal and producing a feed-back signal proportionally representative of such magnitude,
   reference means for producing a reference signal,
   comparison means for making a comparison of such feedback and reference signals to provide a control for said energy conversion means, and
   electronic power control means responsive to the setting of said selective adjustment means and such feed-back signal from said feed-back means for controlling the magnitude of such welding signal, and
   said conversion means, including said selective adjustment means and feed-back means, having a cooperative interrelationship ordinarily for limiting the normal power output capability thereof to one suitable for such continuous type welding and for stud welding studs of relatively small size,
   the improvement comprising:
   selectively operable control means for increasing the power output capability of said conversion means beyond such normal rating to one suitable for stud welding studs of a wide range of stud sizes including relatively large size studs ordinarily not able to be stud welded at such normal power output capability,
   selectively operable sequencing means for controlling a timed sequence of operation of said conversion means to produce such regulated output electrical power welding signal at such increased capability for a relatively short term timed duration suitable for stud welding, and
   selectively operable mode changing means for changing the mode of operation of the power supply from substantially continuous type operation to increased output power capability timed operation with said control means and sequencing means for stud welding, said mode changing means comprising means for altering, the comparison ratio of such feed-back signal and such reference signal, to permit increased conduction angles in said energy conversion means beyond those normally employed during such substantially continuous type operation.

31. The supply of claim 30, said control means including means for increasing the normal power output capability of said conversion means by a factor of at least two.

32. The improvement of claim 30, said mode changing means including means for altering the proportional relation of said feed-back and welding signals in dependence on the operative mode of the power supply to obtain such increased power output capability from said conversion means.

33. The improvement of claim 30, further comprising means for altering the magnitude set by said selective adjustment means at the beginning of a cycle of timed operation of the power supply to limit the current of such welding signal.

34. The improvement of claim 33, said sequencing means including energizing means for directly energizing a lifting solenoid of a stud welding gun upon commencing such timed sequential operation.

35. The improvement of claim 34, said sequencing means further comprising means for continuing production of said welding signal at an electronically controlled current after said lifting solenoid has been deenergized by said energizing means, whereby said welding signal is continued to provide a hot plunge of the stud at the conclusion of timed operation.

36. The improvement of claim 30, further comprising latch circuit means operable upon completion of a timed operation of stud welding by a stud welding gun for disabling said sequencing means from subsequent timed operation until the stud welding gun is removed from a welded stud.

37. The improvement of claim 30, said conversion means including a controlled rectifier circuit, said electronic power control means comprising contactor means for controlling the passing of gating signals to said controlled rectifier circuit, and said sequencing means including means for enabling and disabling said contactor means.

38. The improvement of claim 30, wherein said mode changing means comprises a multiple pole multiple throw switch.

39. The improvement of claim 30, further comprising sensor means for monitoring a parameter of said conversion means and shutting down the latter upon detecting an excessive condition of such parameter.

* * * * *